(12) United States Patent
Weiblen et al.

(10) Patent No.: US 6,872,911 B2
(45) Date of Patent: Mar. 29, 2005

(54) WELDING METHOD

(75) Inventors: Kurt Weiblen, Metzingen (DE); Christian Ohl, Reutlingen (DE); Oliver Kohn, Reutlingen (DE); Frieder Haag, Wannweil (DE); Michael Honer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/482,568

(22) PCT Filed: Jun. 12, 2002

(86) PCT No.: PCT/DE02/02145

§ 371 (c)(1),
(2), (4) Date: May 27, 2004

(87) PCT Pub. No.: WO03/004211

PCT Pub. Date: Jan. 16, 2003

(65) Prior Publication Data

US 2004/0200569 A1 Oct. 14, 2004

(30) Foreign Application Priority Data

Jun. 29, 2001 (DE) ......................................... 101 31 430

(51) Int. Cl.$^7$ ........................... B23K 26/20; B32B 31/00
(52) U.S. Cl. ........................... 219/121.64; 219/121.82; 156/69; 156/272.8
(58) Field of Search ..................... 219/121.6, 121.63, 219/121.64, 121.82, 121.83, 121.85; 228/125, 212; 156/69, 70, 73.5, 73.6, 272.8, 308.4, 350

(56) References Cited

U.S. PATENT DOCUMENTS

| 4,061,263 A | * 12/1977 | Ohlstein ................... 228/124.1 |
| 4,605,156 A | * 8/1986 | Stenger et al. .............. 228/127 |
| 6,193,833 B1 | 2/2001 | Gizowski et al. |

FOREIGN PATENT DOCUMENTS

| DE | 195 10 493 | 10/1995 |
| DE | 196 25 873 | 1/1998 |
| DE | 199 47 437 | 4/2001 |
| DE | 101 09 594 | 9/2001 |

\* cited by examiner

*Primary Examiner*—Samuel M. Heinrich
(74) *Attorney, Agent, or Firm*—Kenyon & Kenyon

(57) ABSTRACT

A method is proposed for welding a first component part to a second component part, the energy to melt melting regions being supplied by a laser beam. In this context, the laser beam is directed through the first component part, which is made of a nonabsorbing material, to the second component part. The second component part is made of a material which strongly absorbs laser beam. At least one stop is provided outside melting regions.

4 Claims, 4 Drawing Sheets

WELDING METHOD

FIELD OF THE INVENTION

The present invention is based on a method for welding.

BACKGROUND INFORMATION

Methods for welding component parts are already known in which the welding energy is supplied by a laser. In this context, so-called transmission technique welding methods are known in which the laser beam is directed through a transparent component onto a second component which absorbs the laser beam. Because of the absorption, this region is strongly heated, until melting of the material takes place. When the fused portion gets in touch with the material of the transparent component, this material is also melted, so that welding of the two components takes place. In order to guarantee contact of the fused portion of the absorbing material with the transparent material, the two components are pressed together during welding. The distance between them is set by measuring the welding path and by regulating the energy supplied, or it sets in after welding as a function of the force used.

SUMMARY OF THE INVENTION

On the other hand, the method according to the present invention has the advantage that the distance between the two components during welding is predefined by the stops. The distance between the two components in the welded state is thus not dependent on the force with which the two components are pressed together during welding. If the two components are at an angle to each other in the fused region, excess molten material may be conducted in a defined way to one side of the melting region. In that way, the quality of the welding site is improved.

The stops may optionally be designed to be on only one side of the welding seam or on both sides of the welding seam. The method according to the present invention is particularly suitable for welding components to one another which form a housing, especially a housing for an electronic component.

DETAILED DESCRIPTION

Figure 1:
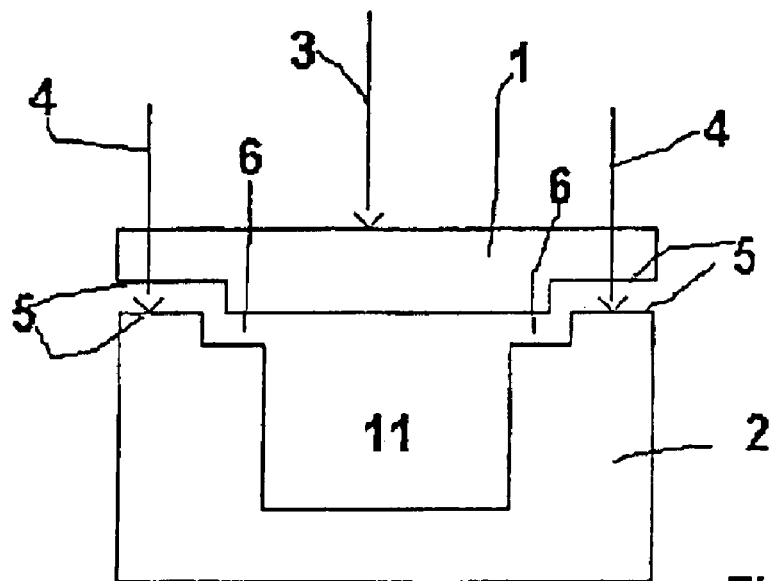
FIGS. 1 and 2 show a first exemplary embodiment.

With the aid of cross sections through the component parts, FIG. 1 shows a first exemplary embodiment of the method according to the present invention for welding component parts. FIG. 1 shows a condition before welding and FIG. 2 after welding.

FIG. 1 shows a first component part 1 and a second component part 2 in cross section. First component part 1 is particularly thought of as being a housing cover, and second component part 2 is particularly thought of as being a housing base. As indicated by force arrow 3, the first component part is pressed against second component part 2. Then, in the state at which they are pressed together, laser beams 4 are directed all the way through component part 1 at component part 2. Component part 1 is made of a material which is transparent to laser beams, i.e. as good as none, or only a little absorption of energy from laser beam 4 takes place in the material of component part 1. Component part 2 is made of a material which strongly absorbs laser beam 4. This absorption brings on a strong heating effect, since the energy of the laser beam is absorbed in a low volume of component part 2. Component parts 1 and 2 each have melting regions 5. In the case of these melting regions 5, the regions involved are regions which are molten for the actual welding, i.e. the regions of component parts 1 and 2 whose materials are mixed with each other by being molten, and thus form the actual welding connection. These regions are denoted as melting regions 5, independently of whether before or after the actual welding.

Plastics are especially considered as materials for component parts 1 and 2. In the case of such plastics, using appropriate additives, particularly for laser beams in the infrared range, it may be accomplished that the one plastic material absorbs as good as none of the energy of the infrared laser beam, while the other material strongly absorbs the energy of the infrared laser.

When the laser beams are irradiated into melting regions 5 of strongly absorbing component part 2, a great quantity of heat is introduced into this melting region 5. Therefore, the material of lower component part 2 begins to melt. When this fluid melt comes into contact with melting region 5 of upper component part 1, upper component part 1 is also molten in this melting region 5. This is attained by pressing component parts 1 and 2 together during the welding process, and thus the molten material of lower component part 2 comes in contact with upper component part 1. Small gaps possibly still in existence are bridged by capillary forces. By melting the materials of component parts 1 and 2 in melting regions 5, this brings on a thorough mixing and finally the development of the actual welding connection. This welded joint 7 is shown in cross-section in FIG. 2. By the welded joint 7 thus developed, component part 1 and component part 2 are firmly connected to each other. If welded joint 7 is designed as a circumferential welding seam, a hermetically sealed connection of component parts 1 and 2 is created. In particular, component part 2, which is here designed as a housing base, may have a large recess 11, in which components to be packaged before welding, particularly electronic switching circuits, may be positioned.

Figure 2:
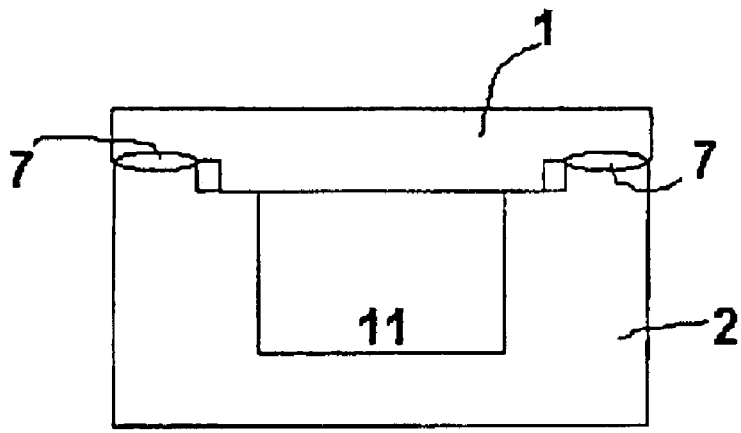

If, during welding, component parts 1, 2 are pressed against each other using sufficiently great force, molten material is expressed sideways from welding regions 5. Thus, depending on force 3, the geometric form of welded joint 7 and thus also the distance between the two component parts 1, 2 in the welded state will vary. According to the present invention, it is therefore proposed that stops 6 be provided which limit the movement of the two component parts 1, 2 during welding in the direction of force 3. In FIGS. 1 and 2, stops 6 are created by a corresponding stepwise design of first component part 1 and of second component part 2, the stepwise projections being dimensioned so that, before welding, component parts 1 and 2 first rest upon one another in melting regions 5. Then, when the laser energy is irradiated into melting regions 5, a little of the molten material is displaced sideways, and the stepwise stops come to lie on each other. Then, after cooling, component parts 1 and 2 lie on stops 6 which lie next to welding connections 7. Stops 6 are situated geometrically next to melting regions 5, so as to make sure that the laser irradiation will not cause a softening of stops 6 and thus, possibly, deformability in these areas.

Figure 3:
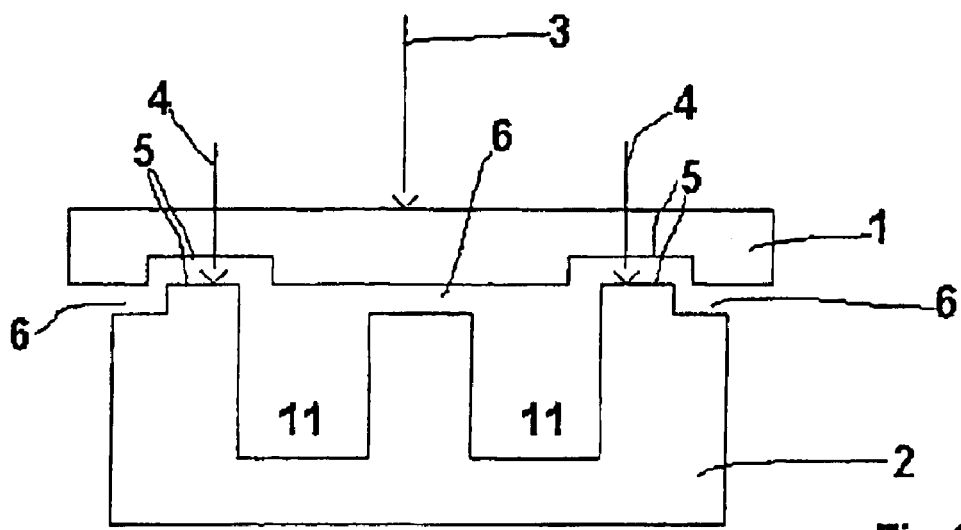
FIGS. 3 and 4 show a second exemplary embodiment.
Figure 4:
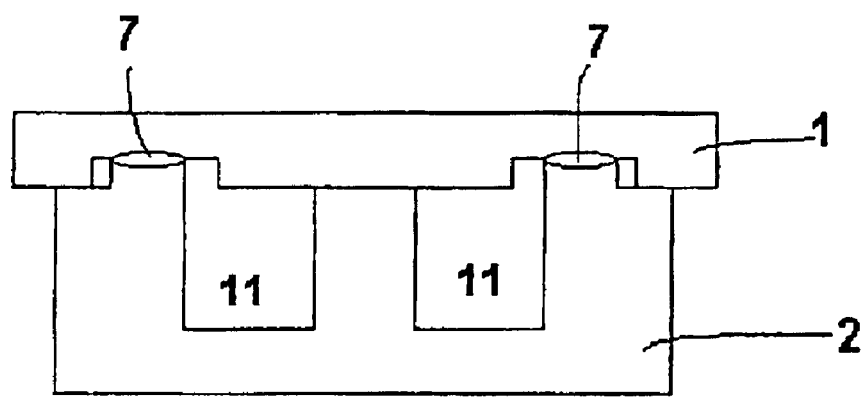

An additional exemplary embodiment of the method according to the present invention is explained in FIGS. 3 and 4. Reference numerals 1, 2, 3, 4, 5, 7 and 11 denote again the same objects as in FIGS. 1 and 2 which also fulfill the same functions. However, in contrast to FIGS. 1 and 2, in FIGS. 3 and 4 a larger number of stops 6 is provided. In this context, in particular, stops 6 are situated not only on one side of melting regions 5 but on both sides of melting regions 5. In the outer regions, stops 6 are provided which are situated directly next to welding regions 5. In the middle region of component parts 1, 2 an additional central stop 6 is provided, which is positioned relatively far from melting regions 5. On account of this central stop 6, in particular, deformation of component part 1 is limited during the welding procedure. This is especially meaningful if components 1 and 2 form a housing in which the hollow spaces 11 enclosed therein have a large lateral expansion. In that case, the first component part 1 is designed as a cover which also has a great lateral expansion. Compared to lateral expansion, component part 1, which forms the cover, is designed relatively thin in its thickness. By introducing force 3 during the welding procedure, a deformation of component part 1, which forms the cover, may therefore come about, and component part 1 would again take on its original shape after welding, when force 3 is no longer acting upon component part 1. Thus, mechanical stresses would be generated in component part 1 which would place a load on the welding connection. Since the deformation of component part 1 during welding is limited in the middle region by stop 6, mechanical stresses in the finished housing are also lowered by this measure.

Figure 5:
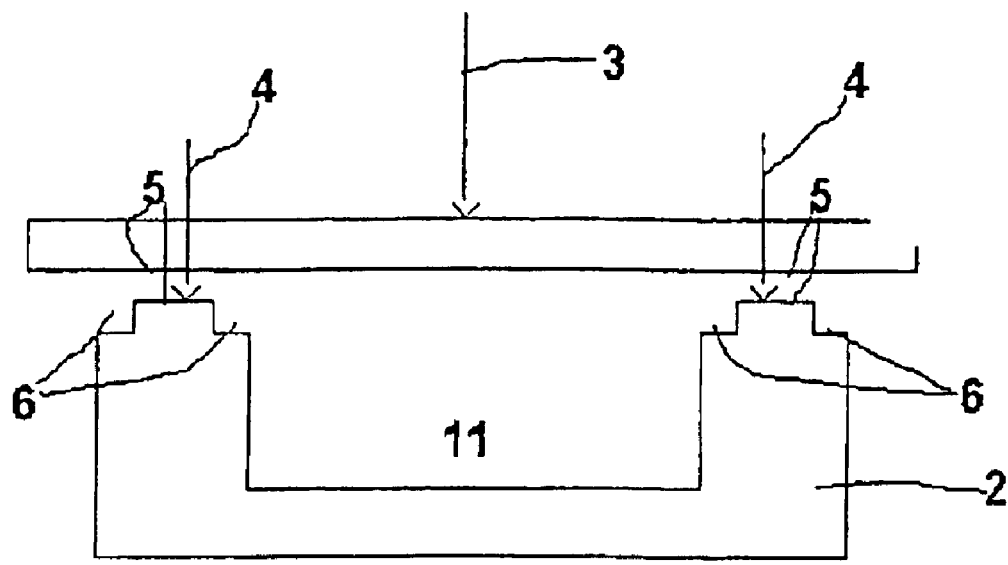
FIGS. 5 and 6 show a third exemplary embodiment.
Figure 6:
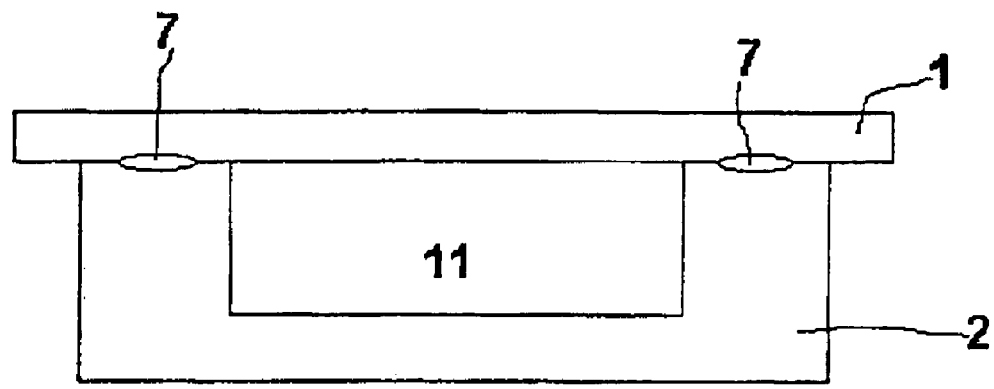

FIGS. 5 and 6 show another exemplary embodiment of the method according to the present invention. Reference numerals 1, 2, 3, 4, 7 and 11 denote again the same objects as in the previous figures which also fulfill the same functions. However, one difference comes about here by the design of molten regions 5 and stops 6. As may be seen in FIG. 5, component part 1 is designed simply as a plate-shaped component element having plate surfaces which have no structuring. Second component element 2 has a melting region 5 which has a certain elevation compared to stops which are situated in the immediate closeness to melting region 5, on both sides of melting region 5. The height of this elevation is illustrated in FIG. 5 in an exaggerated manner, and depends in reality essentially on to what depth laser beams 4 melt the material of second component part 2. FIG. 6 shows a cross section through the finished welded component, where it should be realized that first component part 1 essentially lies flat on the plane which was formed in FIG. 5 by stops 6 of component part 2. Welded joints 7 extend, starting from this plane, slightly into component parts 1 and 2. The advantage of the method according to FIGS. 5 and 6 is the simple embodiment of first component part 1, which, in particular, may be designed as a simple plate.

Figure 7:
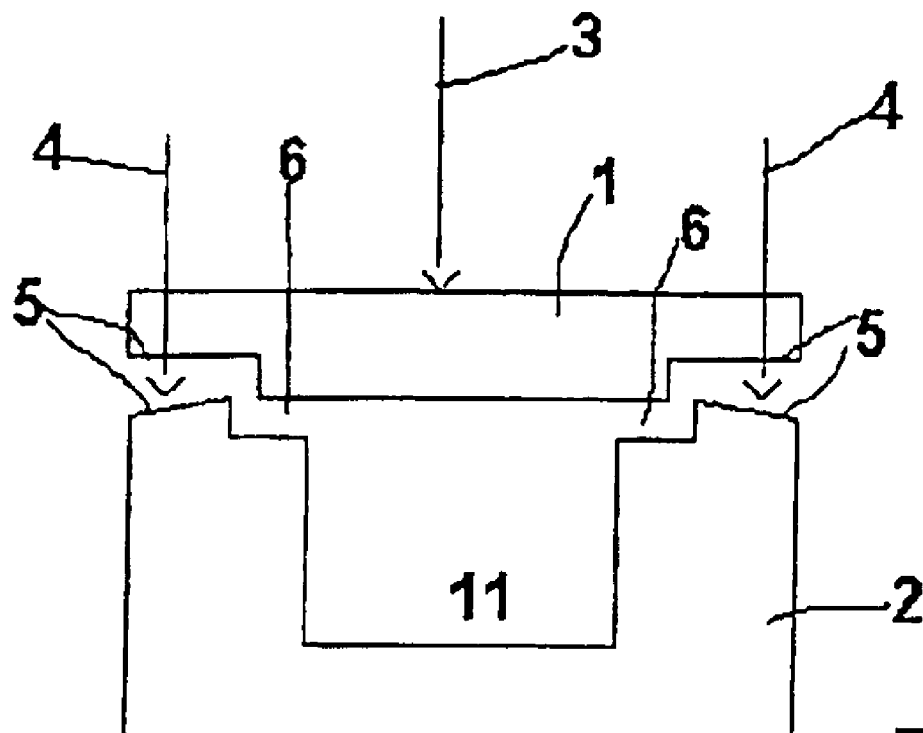
FIGS. 7 and 8 show a fourth exemplary embodiment.
Figure 8:
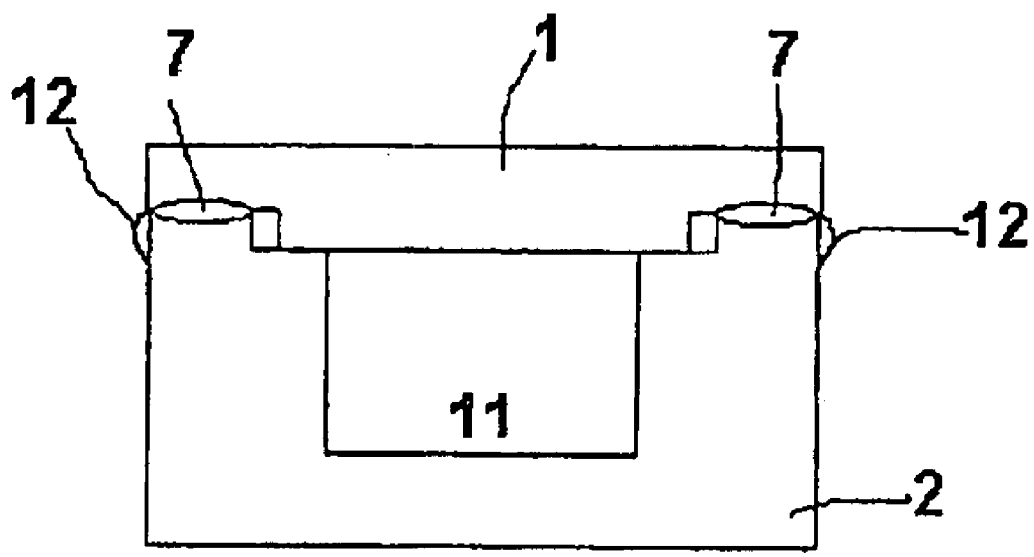

FIGS. 7 and 8 show another exemplary embodiment of the method according to the present invention. Reference numerals 1, 2, 3, 4, 5, 6, 7 and 11 denote again the same objects as in FIGS. 1 and 2 which also exercise the same functions. However, in contrast to FIG. 1, melting region 5 of component part 2 is not designed to be parallel to melting region 5 of component part 1, but is at an angle to it. By this angle is achieved that molten material of lower component part 2 and of upper component part 1 is displaced sideways toward the outside in a defined manner by the pressing together of component parts 1, 2. This is made clear in FIG. 8 by welding material drops 12, which are squeezed out sideways from welded joints 7 during welding. By the beveling of melting region 7 of component part 2, a preferred exit of excess molten material in the lateral direction was effected.

Naturally, it is also possible to design both melting regions 5, i.e. both on component part 1 and on component part 2, to be beveled, particularly so that they do not form a right angle with the direction of force 3. The lateral expulsion of molten material is thereby boosted even more. Further more, this form of embodiment of melting region 5 makes sense even without the formation of stops 6, since, by the beveled melting regions of component parts 1, 2 that have not yet been welded, in any case a sideways exit of excess molten material is ensured. However, both measures, i.e. stops 6 and beveled design of melting regions 5 contribute to improving the quality of the welding of component parts 1 and 2. This is to be desired particularly in the field of packaging electronic components, since in that field very strict requirements are placed on the quality of a welded joint for a housing for an electronic component.

What is claimed is:

1. A method for welding a first component part to a second component part, comprising:

causing a laser beam to supply an energy to melt melting regions of the first component part and the second component part, the first component part being made of a material that only weakly absorbs the energy of the laser beam, and the second component part being made of a material that strongly absorbs the energy of the laser beam;

directing the laser beam all the way through the first component part to the second component part;

pressing the first component part and the second component part against each other from a point of welding taking place; and angling the first component part and the second the component part to each other in the melting regions before welding, so that, during welding, a preferred exit of molten material on one side of the melting regions is effected.

2. The method as recited in claim 1, wherein:

in the welded state, a housing is created by the first component part and the second component part.

3. The method as recited in claim 2, wherein:

the housing is for an electronic component.

4. The method as recited in claim 1, wherein:

the first component part and the second component part include a plastic, and different absorption properties are set by addition of further substances to the plastic.

* * * * *